US006900776B2

(12) United States Patent
Vaccarelli

(10) Patent No.: US 6,900,776 B2
(45) Date of Patent: May 31, 2005

(54) MICROSCOPY LABORATORY SYSTEM

(75) Inventor: Vincent Vaccarelli, Getzville, NY (US)

(73) Assignee: Leica Microsystems Inc., Depew, NY (US)

( * ) Notice: Subject to any disclaimer, the term of this patent is extended or adjusted under 35 U.S.C. 154(b) by 339 days.

(21) Appl. No.: 09/821,578

(22) Filed: Mar. 29, 2001

(65) Prior Publication Data

US 2002/0140630 A1 Oct. 3, 2002

(51) Int. Cl.[7] .............................................. G09G 5/00
(52) U.S. Cl. ...................................................... 345/2.2
(58) Field of Search ................................ 434/350, 351, 434/362, 432, 433; 359/368, 363; 382/128; 348/79, 80; 396/432; D16/131; 345/1.2, 1.3, 2.1, 2.2

(56) References Cited

U.S. PATENT DOCUMENTS

| | | | |
|---|---|---|---|
| 4,202,037 A | * 5/1980 | Glaser et al. | 345/632 |
| 5,376,007 A | * 12/1994 | Zirm | 434/350 |
| 5,484,293 A | 1/1996 | Ford et al. | 434/432 |
| 5,793,969 A | * 8/1998 | Kamentsky et al. | 359/368 |
| 6,147,797 A | * 11/2000 | Lee | 359/368 |
| 6,476,858 B1 | * 11/2002 | Ramirez Diaz et al. | 348/159 |

OTHER PUBLICATIONS

"General Presentations, Training and Collaborative Planning" http://www.boeckeler.com/pointmaker/slide-shows/general, Jan. 24, 2000.*

* cited by examiner

*Primary Examiner*—Chanh Nguyen
(74) *Attorney, Agent, or Firm*—Simpson & Simpson, PLLC

(57) ABSTRACT

A microscopy laboratory system for efficient instruction is disclosed. The system comprises a plurality of student microscopes each equipped with a camera for generating an image signal representing a student view image of at least a portion of the field of view of the student microscope, multiplexed control means connected by video cables or wireless technology to the cameras to provide a composite instruction image signal based on student view images from one or more selected microscopes, and a projection unit or other public display for presenting the instruction image to the students in the laboratory. An instructor microscope can also be coupled into the system, and a display image marker is preferably linked to the multiplexed control means for inserting instructor annotations into the displayed instruction image.

19 Claims, 5 Drawing Sheets

MICROSCOPY LABORATORY SYSTEM

BACKGROUND OF THE INVENTION

The present invention relates generally to instructional settings wherein participants view specimens through respective microscopes, and more particularly to a microscopy laboratory system wherein an instructor and students can view an overall instructional image that selectively includes images from the field of view of one, some, or all of the microscopes in the laboratory.

Microscopy laboratories at universities, teaching hospitals, etc. are known to include a television monitor or projection unit that receives an image signal from a camera mounted on the instructor's microscope, such as by a C-mount, trinocular viewing body, video module, or the like. In this way, each student in the laboratory can view an image that serves as a model to help him or her position a like specimen on his or her own microscope and to adjust the specimen location, objective power, focus, illumination, filters and other parameters of the microscope in an effort to match the displayed image from the field of view of the instructor's microscope. In this type of system, it is also known to provide a marking device that allows the instructor to annotate the displayed image from his or her microscope. Absent this technology, a photograph in a textbook is often used as a model. A drawback of this system is that the instructor cannot see what the students are viewing through their own microscopes. Often, the instructor must walk around the laboratory and look through each student's microscope to make sure every student in the laboratory is viewing a proper image, or the instructor must walk over to a particular student's station whenever a question arises. Clearly, this type of system is inefficient because the instructor must spend time checking the student microscopes rather than instructing the students. Another drawback is that the instructor has no means to annotate an image from a student's microscope to better provide constructive criticism or positive reinforcement.

BRIEF SUMMARY OF THE INVENTION

Therefore, it is an object of the present invention to provide an improved microscopy laboratory system that allows an instructor and students to simultaneously see images from the field of view of one, some, or all of the student microscopes as desired.

It is another object of the present invention to provide an improved microscopy laboratory system that allows an instructor to annotate images from the field of view of the instructor's microscope and any student's microscope for instructional purposes.

These and other objects are achieved by a microscopy laboratory system according to the present invention. The system comprises a plurality of student microscopes each having a camera, for example a digital video camera, coupled thereto for generating an image signal representing a student view image of at least a portion of the field of view of the student microscope. The system also comprises multiplexed control means connected by video cables or wireless technology to the cameras to receive the respective image signals, and a display means such as a projection unit, one or more shared viewing monitors, or individual student viewing monitors connected to the multiplexed control means for presenting an instruction image to the students in the laboratory. The multiplexed control means enables an instructor to select a set of image signals that will make up the publicly displayed instruction image. Where more than one image signal is selected, the instruction image is divided into smaller image windows corresponding to the selected image signals. The selected set of image signals can be a set of one image signal, a set of image signals corresponding to one of a plurality of predefined sub-groups of image signals, a sub-group of image signals chosen by the instructor, or a set of all the available image signals.

The microscopy laboratory system preferably comprises an instructor microscope equipped with a camera that is also connected to supply an image signal to the multiplexed control means, whereby the instruction image can include an instructor view image. A dedicated instructor monitor is preferably provided for presenting the instruction image to the instructor. The system also preferably comprises a display image marker connected to the multiplexed control means for enabling the instructor to annotate the instruction image seen by the students, and a computer linked to the multiplexed control means for storage, retrieval, and enhancement of images.

BRIEF DESCRIPTION OF THE SEVERAL VIEWS OF THE DRAWINGS

The nature and mode of operation of the present invention will now be more fully described in the following detailed description of the invention taken with the accompanying drawing figures, in which.

DETAILED DESCRIPTION OF THE INVENTION

Figure 1:
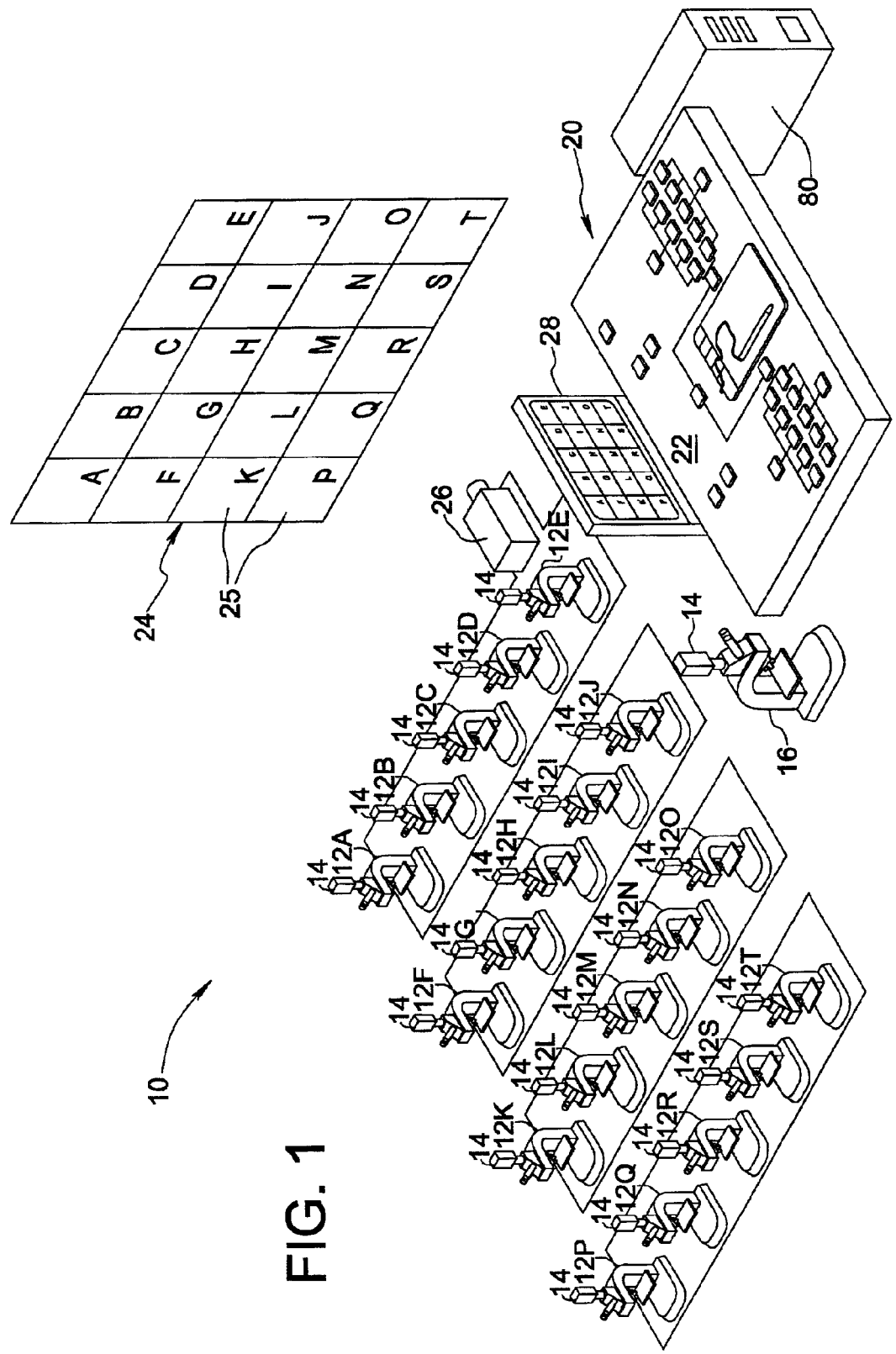
FIG. 1 is a general schematic view of a microscopy laboratory system formed in accordance with an embodiment of the present invention.
Figure 2:
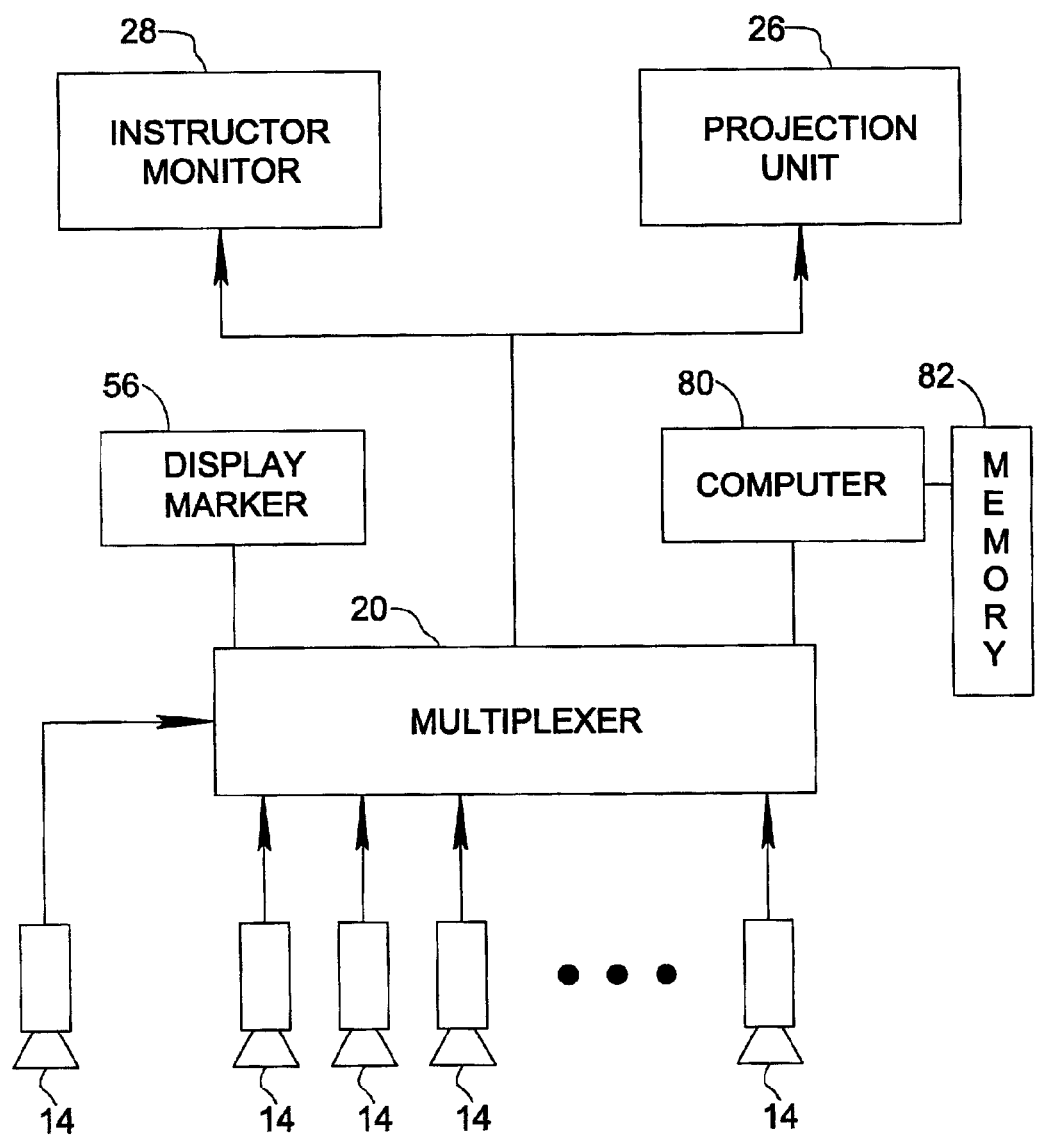
FIG. 2 is a block diagram showing connections between hardware components of the microscopy laboratory system shown in FIG. 1.

Referring initially to FIGS. 1 and 2 of the drawings, a microscopy laboratory system formed in accordance with a first embodiment of the present invention is generally identified by reference numeral 10. Microscopy laboratory system 10 comprises a plurality of student microscopes 12A–12T each equipped with a video camera 14 for generating an image signal representing a student view image of at least a portion of the field of view of the corresponding student microscope, and an instructor microscope 16 likewise equipped with a camera 14 for generating an image signal representing an instructor view image of at least a portion of the field of view of instructor microscope 16. Cameras 14 are preferably video cameras that are either retro-fitted to or integrated with the microscope through a C-mount, a trinocular viewing body attachment, or an integrated video module inserted between the microscope stand and the binocular tube of the microscope. By way of non-limiting example, the Leica IC A and Leica ICC A video modules available from Leica Microsystems Inc. are suitable for practicing the present invention with various specified microscope models available from the same supplier.

Figure 3:
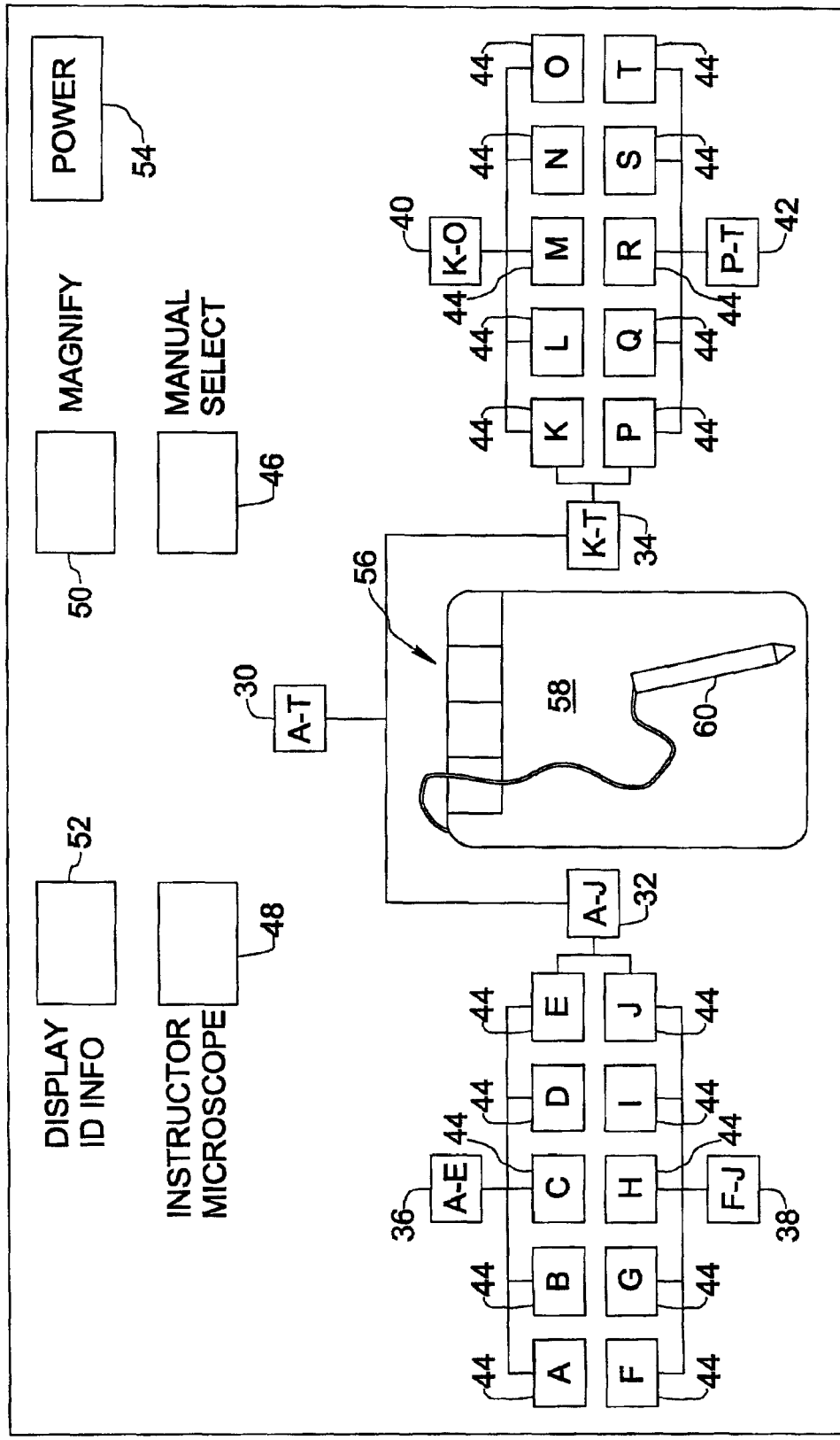
FIG. 3 is a plan view of a user interface of a multiplexer control means of the embodiment shown in FIG. 1.

Microscopy laboratory system 10 further comprises multiplexed control means 20 connected to cameras 14 for receiving image signals as input, enabling an instructor to select a set of the received image signals for display as output, and generating an instruction image signal based on the selected set of image signals. In the embodiment of FIGS. 1 and 2, multiplexed control means 20 is a video multiplexer configured with a custom user interface 22, for example a user interface as shown in FIG. 3, that allows the instructor to establish a suitable instruction image 24 as will be described below. Multiplexed control means 20 could also be a digital image multiplexer, depending on the format of the image signals from cameras 14.

The instruction image signal from multiplexed control means 20 is communicated to a suitable public display device, such as a projection unit 26 connected to the multiplexed control means, so that all students can simultaneously view instruction image 24. As an alternative to projecting instruction image 24 for public viewing, it is of course possible to provide one or several shared viewing monitors, and it is also possible to provide each student microscope station with its own viewing means, such as a small video monitor or display unit (not shown) connected to receive output from multiplexed control means 20. An instructor monitor 28 is preferably provided in the vicinity of user interface 22 for facilitating ergonomically agreeable viewing of instruction image 24 by the instructor.

User interface 22 shown in FIG. 3 generally comprises a bracketed button system that enables the instructor to compose a suitable instruction image 24 by choosing a set of image signals corresponding to view images which the instructor wishes to include in the instruction image. Selection of button 30 results in an instruction image 24 like that illustrated in FIG. 1, in which the instruction image is divided into a plurality of smaller image windows 25 such that all of the student view images from student microscopes 12A–12T are presented in the instruction image. Selection of button 32 yields an instruction image containing only student view images from student microscopes 12A–12J, while selection of button 34 yields an instruction image containing only student view images from student microscopes 12K–12T. Instruction image 24 can be restricted to further subgroups of student view images by selection of button 36 corresponding to student microscopes 12A–12E, button 38 corresponding to student microscopes 12F–12J, button 40 corresponding to student microscopes 12K–12O, or button 42 corresponding to student microscopes 12P–12T. Instruction image 24 can also be limited to a single student view image from a chosen student microscope by pressing any one of buttons 44. A MANUAL SELECT button 46 is preferably provided to allow the instructor to compose an instruction image that differs from one of the predetermined subgroups associated with buttons 32, 34, 36, 38, 40, and 42. With MANUAL SELECT button 46 depressed, the instructor can then select more than one button 44 to choose the desired student view images. The instructor may also present an instruction image corresponding to the image signal from instructor microscope 16 using INSTRUCTOR MICROSCOPE button 48. An image magnification function is preferably provided and is accessed through MAGNIFY button 50. If desired, identifying indicia 27 are superimposed in each image window 25 to indicate the particular microscope associated with the image window by pressing DISPLAY ID INFO button 52. User interface 22 is also shown as including a POWER button 54.

Microscopy laboratory system 10 further comprises a display image marker 56 connected to the multiplexed control means 20 for enabling the instructor to annotate instruction image 24, and a computer 80 having memory 82 also connected to the multiplexed control means for storing instruction image 24 and/or student view images from microscopes 14 and/or an instructor view image. Display image marker 56 can be a video marking system that takes input from a digitizing tablet 58 and accompanying pen 60, and/or from other input sources such as a keyboard, light pen, or touch screen, and superimposes markings on instruction image 24. Display image marker 56 can be integrated with multiplexed control means 20, as shown, or can be connected as a stand-alone portion of the system. As will be appreciated, display image marker 56 gives the instructor considerable power to highlight important image features to all students, highlight problems with a particular student view image, and emphasize positive aspects a particular student view image. Computer 80 can be used to store images to and retrieve images from memory 82, and to enhance images using available software.

Figure 4:
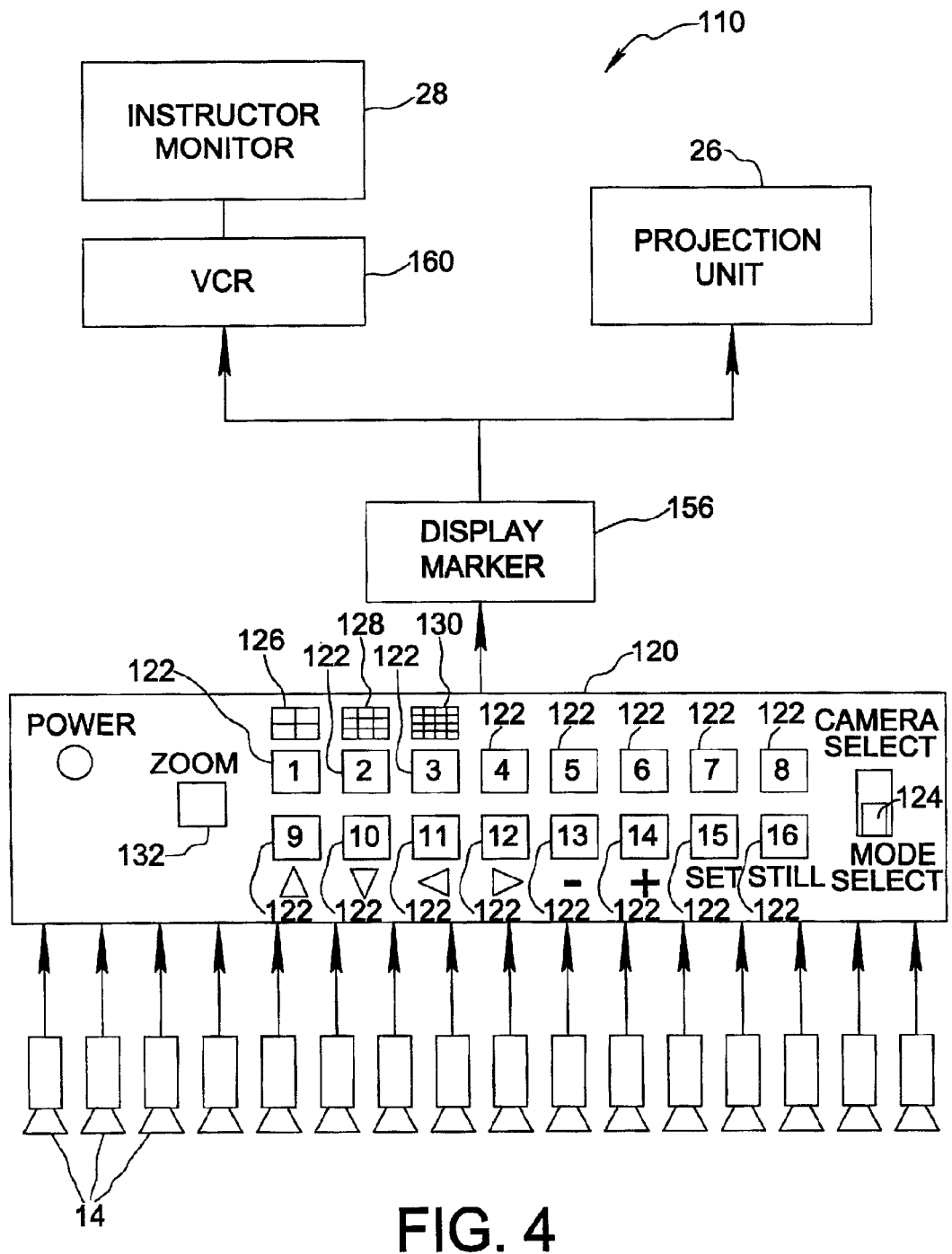
FIG. 4 is schematic diagram of a microscopy laboratory system formed in accordance with another embodiment of the present invention utilizing a commercially available multiplexer.

FIG. 4 shows an embodiment of the present invention wherein a microscopy laboratory system 110 is configured using an existing "off the shelf" video multiplexer 120. Video multiplexer 120 is a PANASONIC® WJ-FS216 Digital Video Simplex Multiplexer having sixteen camera inputs for receiving image signals from sixteen cameras 14, one camera being coupled with an instructor microscope and the remaining fifteen cameras being coupled with respective student microscopes. Buttons 122 on multiplexer 120 allow the image signal from a particular camera to be selected when toggle 124 is switched to a "CAMERA SELECT" position. Certain of the buttons 122 have a dual function that is enabled when toggle 124 is switched to a "MODE SELECT" position as shown in FIG. 4. More specifically, the buttons for the first through third cameras each have a second mode for providing a multi-window display of four, nine, and sixteen image windows, as indicated by icons 126, 128, and 130, respectively. A ZOOM button 132 for magnifying instruction image 24 is also provided.

Microscopy laboratory system 110 also includes a commercially available display image marker 156. The POINT-MAKER® PVI-44 Video Marker available from Boeckeler Instruments, Inc. is suitable for practicing the present invention. Display image marker 156 is connected by standard video cable to receive an output image signal from multiplexer 120. A final instruction image signal, including any annotations added by way of display image marker 156, is supplied to projection unit 26 and to an optional videocassette recorder 160 operatively associated with instructor monitor 28. Consequently, it is possible to record instructional lessons and observed microscopic processes for future use.

Figure 5:
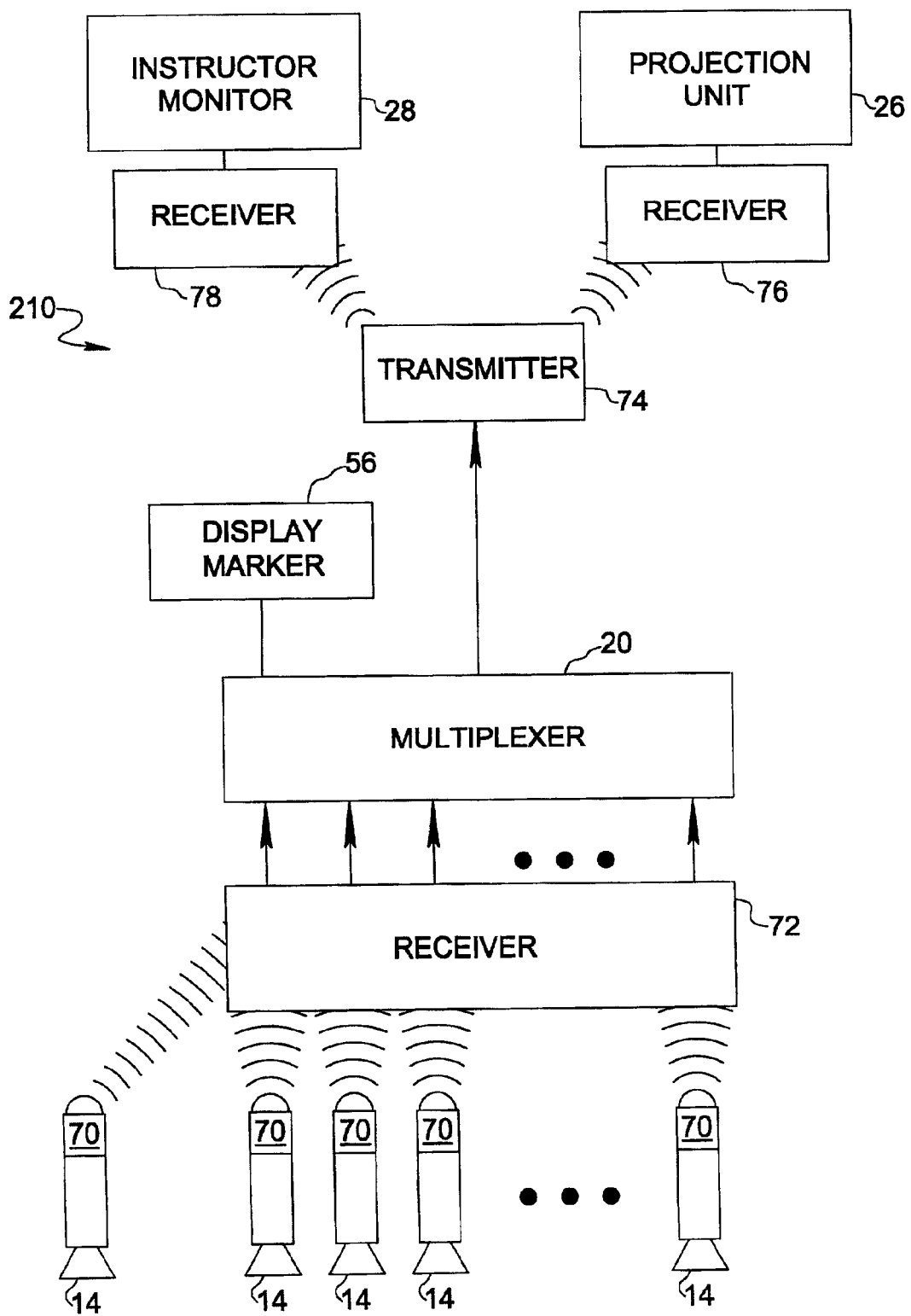
FIG. 5 is a schematic diagram of a microscopy laboratory system formed in accordance with another embodiment of the present invention utilizing wireless signal communication.

The embodiments described above rely on video cables for transmitting image signals between components. In situations where extensive cabling is impractical, unsafe, or otherwise undesirable, it is contemplated to provide wireless connections enabling transmission of image signals from cameras 14 to multiplexed control means 20, and from multiplexed control means 20 to projection unit 26 or to individual or shared student viewing monitors. FIG. 5 shows a microscopy laboratory system 210 that is generally similar to systems 10 and 110 described above, however cameras 14 are with transmitters 70 for transmitting the image signals to a multi-channel receiver 72 connected to multiplexed control means 20. In addition, a transmitter 74 is operatively connected to multiplexed control means 20 and communicates with corresponding receivers 76 and 78 linked to projection unit 26 and instructor monitor 28, respectively. Receivers 72, 76 and 78 and transmitters 70 and 74 can be analog wireless communication devices or digital wireless communication devices, depending upon system requirements.

What is claimed is:

1. A microscopy laboratory system comprising:
   a plurality of student microscopes;
   a plurality of cameras associated one with each of said plurality of student microscopes for generating an image signal representing a student view image of at least a portion of the field of view of said student microscope;
   multiplexed control means connected to said plurality of cameras for receiving said image signals and enabling an instructor to select a set of said image signals for display, wherein said multiplexed control means generates an instruction image signal generated from said selected set of image signals; and
   display means connected to said multiplexed control means for receiving said instruction image signal and displaying an instruction image comprising student view images corresponding to said selected set of image signals; and
   a display image marker means connected to said multiplexed control means for enabling said instructor to annotate said instruction image.

2. The microscopy laboratory system according to claim 1, further comprising an instructor microscope and a camera for generating an image signal representing an instructor view image of at least a portion of the field of view of said instructor microscope, wherein said multiplexed control means is connected to said camera associated with said instructor microscope to receive said image signal generated thereby, whereby said instruction image optionally comprises said instructor view image.

3. The microscopy laboratory system according to claim 1, wherein said multiplexed control means allows said instructor to select all of said image signals from said cameras associated with said plurality of student microscopes as said selected set.

4. The microscopy laboratory system according to claim 2, wherein said multiplexed control means allows said instructor to select all of said image signals from said cameras associated with said plurality of student microscopes as said selected set.

5. The microscopy laboratory system according to claim 1, wherein said multiplexed control means allows said instructor to select said image signal from said camera associated with any one of said plurality of student microscopes as said selected set.

6. The microscopy laboratory system according to claim 2, wherein said multiplexed control means allows said instructor to select said image signal from said camera associated with any one of said plurality of student microscopes as said selected set.

7. The microscopy laboratory system according to claim 1, wherein said multiplexed control means allows said instructor to select said image signals from cameras of a predetermined sub-group of said plurality of student microscopes as said selected set.

8. The microscopy laboratory system according to claim 2, wherein said multiplexed control means allows said instructor to select said image signals from cameras of a predetermined sub-group of said plurality of student microscopes as said selected set.

9. The microscopy laboratory system according to claim 7, wherein there is a plurality of different predetermined sub-groups of said student microscopes.

10. The microscopy laboratory system according to claim 8, wherein there is a plurality of different predetermined sub-groups of said student microscopes.

11. The microscopy laboratory system according to claim 2, wherein said multiplexed control means allows said instructor to select said image signal from said camera associated with said instructor microscope as said selected set.

12. The microscopy laboratory system according to claim 1, further comprising a computer connected to said multiplexed control means, said computer having a memory, whereby said instruction image and said student view images can be stored in and retrieved from said memory.

13. The microscopy laboratory system according to claim 2, further comprising a computer connected to said multiplexed control means, said computer having a memory, whereby said instruction image, said student view images, and said instructor view image can be stored in and retrieved from said memory.

14. The microscopy laboratory system according to claim 1, wherein said multiplexed control means comprises means for selectively superimposing respective identification information on each said student view image in said instruction image.

15. The microscopy laboratory system according to claim 2, wherein said multiplexed control means comprises means for selectively superimposing respective identification information on each said student view image in said instruction image.

16. The microscopy laboratory system according to claim 1, wherein said multiplexed control means comprises means for magnifying said instruction image.

17. The microscopy laboratory system according to claim 2, wherein said multiplexed control means comprises means for magnifying said instruction image.

18. The microscopy laboratory system according to claim 1, wherein said connection between said multiplexed control means and said plurality of cameras comprises a wireless connection.

19. The microscopy laboratory system according to claim 1, wherein said connection between said display means and said multiplexed control means comprises a wireless connection.

* * * * *